(12) United States Patent
Kawato et al.

(10) Patent No.: US 9,678,246 B2
(45) Date of Patent: Jun. 13, 2017

(54) POLYMERIZABLE COMPOSITION FOR OPTICAL MATERIAL

(71) Applicant: MITSUI CHEMICALS, INC., Minato-ku, Tokyo (JP)

(72) Inventors: Nobuo Kawato, Kurume (JP); Tatsuya Ogawa, Ravenna (IT); Toshiya Hashimoto, Ichihara (JP); Mamoru Tanaka, Fukuoka (JP); Shigetoshi Kuma, Kurume (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/443,277

(22) PCT Filed: Nov. 1, 2013

(86) PCT No.: PCT/JP2013/079790
§ 371 (c)(1),
(2) Date: May 15, 2015

(87) PCT Pub. No.: WO2014/080749
PCT Pub. Date: May 30, 2014

(65) Prior Publication Data
US 2015/0293265 A1    Oct. 15, 2015

(30) Foreign Application Priority Data

Nov. 21, 2012  (JP) .................................. 2012-255568
Mar. 26, 2013  (JP) .................................. 2013-063478

(51) Int. Cl.
*C08K 5/521*   (2006.01)
*G02B 1/04*    (2006.01)
(Continued)

(52) U.S. Cl.
CPC .............. *G02B 1/041* (2013.01); *B29C 39/10* (2013.01); *B29D 11/00009* (2013.01);
(Continued)

(58) Field of Classification Search
CPC ..... C08L 85/02; G02B 1/041; C08G 18/3885; C08K 5/521
See application file for complete search history.

(56) References Cited

U.S. PATENT DOCUMENTS 4,975,328 A   12/1990  Hirose et al.
5,594,088 A *  1/1997  Nagata .................... B29C 33/60
                                               351/159.02
(Continued)

FOREIGN PATENT DOCUMENTS

CN      1036269 A    10/1989
JP      60-194401 A  10/1985
(Continued)

OTHER PUBLICATIONS

International Search Report (PCT/ISA/210) mailed on Jan. 28, 2014, by the Japanese Patent Office as the International Searching Authority for International Application No. PCT/JP2013/079790.
(Continued)

*Primary Examiner* — Michael A Salvitti
(74) *Attorney, Agent, or Firm* — Buchanan, Ingersoll & Rooney PC

(57) ABSTRACT

A polymerizable composition for an optical material includes: (A) one or more isocyanates having two or more isocyanato groups that contains an aromatic isocyanate; (B) one or more alcohols having two or more hydroxyl groups; and (C) an acid phosphate represented by the following formula (1), in which a ratio of the molar number of a secondary hydroxyl group to the total molar number of
(Continued)

primary and secondary hydroxyl groups contained in the alcohol (B) is 50% or higher.

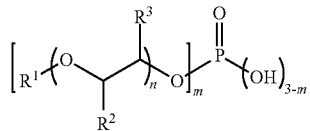

(1)

10 Claims, 1 Drawing Sheet

(51) Int. Cl.
| | |
|---|---|
| C08G 18/48 | (2006.01) |
| C08G 18/76 | (2006.01) |
| C08G 18/32 | (2006.01) |
| C08G 18/38 | (2006.01) |
| B29C 39/10 | (2006.01) |
| B29D 11/00 | (2006.01) |
| G02B 5/30 | (2006.01) |
| C08K 5/3435 | (2006.01) |
| B29K 75/00 | (2006.01) |
| B29K 105/24 | (2006.01) |
| B29K 105/00 | (2006.01) |

(52) U.S. Cl.
CPC ..... *C08G 18/3206* (2013.01); *C08G 18/3885* (2013.01); *C08G 18/4833* (2013.01); *C08G 18/7621* (2013.01); *C08K 5/3435* (2013.01); *C08K 5/521* (2013.01); *G02B 1/043* (2013.01); *G02B 5/3033* (2013.01); *B29K 2075/00* (2013.01); *B29K 2105/24* (2013.01); *B29K 2105/256* (2013.01)

(56) References Cited

U.S. PATENT DOCUMENTS

| | | | |
|---|---|---|---|
| 5,753,730 A * | 5/1998 | Nagata | B29C 33/60 524/136 |
| 5,962,561 A | 10/1999 | Turshani et al. | |
| 2002/0151669 A1 | 10/2002 | Kitahara et al. | |
| 2004/0096666 A1 * | 5/2004 | Knox | B32B 27/08 428/412 |
| 2008/0036964 A1 | 2/2008 | Miura et al. | |
| 2010/0075154 A1 * | 3/2010 | Hayashi | C08G 18/222 428/425.9 |
| 2011/0034660 A1 | 2/2011 | Ryu et al. | |
| 2011/0215493 A1 | 9/2011 | Miura et al. | |
| 2011/0251301 A1 | 10/2011 | Bos et al. | |
| 2015/0293265 A1 * | 10/2015 | Kawato | C08K 5/521 528/72 |

FOREIGN PATENT DOCUMENTS

| | | |
|---|---|---|
| JP | 1-163012 A | 6/1989 |
| JP | 1-302202 A | 12/1989 |
| JP | 3-287641 A | 12/1991 |
| JP | 8-208794 A | 8/1996 |
| JP | 6-136086 A | 5/1997 |
| JP | 2008-144154 A | 6/2008 |
| JP | 2009-520057 A | 5/2009 |
| JP | 2011-012141 A | 1/2011 |
| JP | 2012-521478 A | 9/2012 |
| WO | WO 2007/078549 A2 | 7/2007 |
| WO | WO 2008/018168 A1 | 2/2008 |
| WO | WO 2008/092597 A2 | 8/2008 |
| WO | WO 2010/032365 A1 | 3/2010 |
| WO | WO 2010/043392 A1 | 4/2010 |
| WO | WO 2010/110784 A1 | 9/2010 |

OTHER PUBLICATIONS

Office Action issued by the Chinese Patent Office in corresponding Chinese Patent Application No. 2013800607501 on May 27, 2016 (20 pages).

Search Report issued by the European Patent Office in corresponding European Patent Application No. 13857644.2 on May 3, 2016 (7 pages).

* cited by examiner

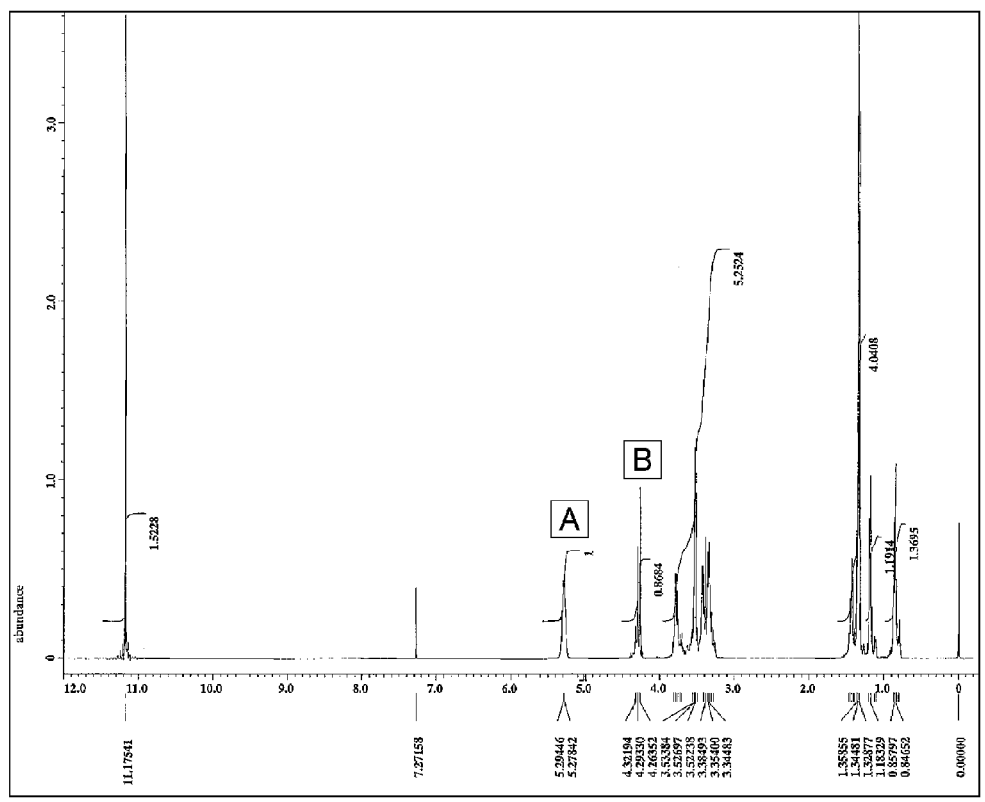

POLYMERIZABLE COMPOSITION FOR OPTICAL MATERIAL

TECHNICAL FIELD

The present invention relates to a polymerizable composition for an optical material from which a urethane molded product is obtained, an optical material obtained from the polymerizable composition, and a method of manufacturing an optical material.

BACKGROUND ART

A plastic lens is lightweight and hardly broken as compared to an inorganic lens, and can be tinted. Therefore, the plastic lens has quickly come into wide use as an optical element such as spectacle lenses or camera lenses, and various resins for spectacle lenses have hitherto been developed and used. Among these resins, representative examples include an allyl resin obtained from diethylene glycol bisallyl carbonate or diallyl isophthalate; a (meth)acrylic resin obtained from (meth)acrylate; and a thiourethane resin obtained from isocyanate and thiol.

Recently, a urethane resin formed of isocyanate and alcohol which has a lower refractive index than the thiourethane resin has been developed (Patent Documents 1 to 5). This urethane resin has a lower refractive index than that of the thiourethane resin but is expected as a cheap lens material. For example, Patent Document 4 describes a urethane resin obtained from 4,4'-methylene-bis(cyclohexylisocyanate), which is an isocyanate, and trimethylolpropane propoxylate and trimethylolpropane which are alcohols.

In addition, Comparative Example 5 of Patent Document 6 describes an example of producing a urethane resin in which tolylene diisocyanate which is easily available at a low cost is used as isocyanate. Examples of commonly-used isocyanate include m-xylylene diisocyanate, 2,5-bis(isocyanatomethyl)-bicyclo-[2.2.1]-heptane, 2,6-bis(isocyanatomethyl)-bicyclo-[2.2.1]-heptane, 1,3-bis(isocyanatomethyl)cyclohexane, hexamethylene diisocyanate, isophorone diisocyanate, and 4,4'-methylene-bis(cyclohexyl isocyanate). The market price of tolylene diisocyanate is the cheapest among these commonly-used isocyanates. By using tolylene diisocyanate, a cheaper spectacle lens can be provided to the market, which significantly contributes to the industry. However, Comparative Example 5 of producing a urethane resin using tolylene diisocyanate describes that a cured product was not able to be obtained due to imperfect molding.

RELATED DOCUMENT

Patent Document

[Patent Document 1] Pamphlet of International Publication No.
[Patent Document 2] Japanese Translation of PCT International Application No. 2009-520057
[Patent Document 3] Pamphlet of International Publication No. WO2010/43392
[Patent Document 4] Japanese Laid-open Patent Publication No. 2011-012141
[Patent Document 5] Japanese Translation of PCT International Application No. 2012-521478
[Patent Document 6] Japanese Laid-open Patent Publication No. 2008-144154

DISCLOSURE OF THE INVENTION

In addition, in a urethane lens, the glass transition temperature Tg indicating heat resistance may fall below 100° C. Therefore, the urethane lens may have a problem such as deformation when being heated during secondary processing such as tinting or coating layer formation. In addition, the urethane lens may significantly fade in color due to organic solvent cleaning after tinting, and the maximum point stress thereof may be low in a three-point bending test indicating the strength of a resin.

In addition, Comparative 5 of Patent Document 6 describes that a molded product was not able to be obtained due to an excessively fast reaction speed during polymerization of tolylene diisocyanate, which is an aromatic isocyanate, and alcohol. A urethane composition has a higher curing rate and higher reactivity than a thiourethane composition and, particularly when being used in combination with an aromatic isocyanate, has far higher reactivity. Therefore, during the preparation, the viscosity rapidly increases along with heat generation. Thus, it is difficult to cast the urethane composition into a mold, and there is a problem in workability during preparation or casting.

In consideration of the above-described problems of the related art, the present inventors have thoroughly studied in order to obtain a polymerizable composition for an optical material which is capable of obtaining a urethane molded product in which the workability during preparation or casting is superior, the heat resistance, the strength (three-point bending test), and the tinting properties are also superior, and striation and color fading caused by solvent cleaning after tinting are suppressed.

The present inventors have found that the above-described problems can be solved by using a polymerizable composition for an optical material including a specific isocyanate, a specific alcohol, and a specific acid phosphate, thereby completing the present invention.

That is, the present invention will be shown as follows.

[1] A polymerizable composition for an optical material including:

(A) one or more isocyanates having two or more isocyanato groups that contains an aromatic isocyanate;

(B) one or more alcohols having two or more hydroxyl groups; and (C) an acid phosphate represented by the following formula (1):

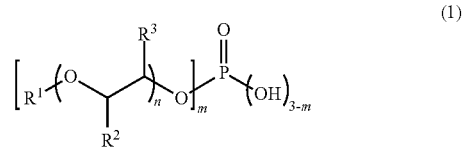

(in the formula, m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group), in which a ratio of the molar number of a secondary hydroxyl group to the total molar number of primary and secondary hydroxyl groups contained in the alcohol (B) is 50% or higher.

[2] The polymerizable composition for an optical material according to [1], in which the alcohol (B) is one or more compounds selected from glycerol, diglycerol, trimethylolpropane, pentaerythritol, di(trimethylolpropane), ethylene oxide adducts of glycerol, ethylene oxide adducts of trimethylolpropane, ethylene oxide adducts of pentaerythritol, propylene oxide adducts of glycerol, propylene oxide adducts of trimethylolpropane, and propylene oxide adducts of pentaerythritol.

[3] The polymerizable composition for an optical material according to [1] or [2], in which the alcohol (B) contains one or more compounds selected from propylene oxide adducts of glycerol, propylene oxide adducts of trimethylolpropane, and propylene oxide adducts of pentaerythritol.

[4] The polymerizable composition for an optical material according to any one of [1] to [3], in which the aromatic isocyanate is 2,4-tolylene diisocyanate or a mixture of 2,4-tolylene diisocyanate and 2,6-tolylene diisocyanate.

[5] The polymerizable composition for an optical material according to any one of [1] to [4], in which an amount of the acid phosphate (C) is 0.1 parts by weight to 3.0 parts by weight with respect to 100 parts by weight of a total weight of the isocyanate (A) and the alcohol (B).

[6] The polymerizable composition for an optical material according to any one of [1] to [5], further including:

a hindered amine compound, in which an amount of the hindered amine compound is 0.1 parts by weight to 2.0 parts by weight with respect to 100 parts by weight of a total weight of the isocyanate (A) and the alcohol (B).

[7] A method of manufacturing a molded product including:

a step of obtaining the polymerizable composition according to any one of [1] to [6] by mixing an alcohol (B) and an acid phosphate (C) with each other to obtain a mixture and then further mixing the mixture with one or more isocyanates (A) having two or more isocyanato groups that contains an aromatic isocyanate at 30° C. or lower;

a step of casting the polymerizable composition into a casting mold; and a step of starting polymerization of the polymerizable composition at 30° C. or lower to polymerize the composition.

[8] A molded product obtained from the polymerizable composition for an optical material according to any one of [1] to [7].

[9] An optical material formed of the molded product according to [8].

[10] A plastic lens formed of the optical material according to [9].

[11] A method of manufacturing a plastic polarizing lens including:

a step of obtaining the polymerizable composition according to any one of [1] to [6] by mixing an alcohol (B) and an acid phosphate (C) with each other to obtain a mixture and then further mixing the mixture with one or more isocyanates (A) having two or more isocyanato groups that contains an aromatic isocyanate at 30° C. or lower;

a step of fixing a polarizing film to an inside of a lens casting mold in a state where at least one surface of the polarizing film is separated from the mold;

a step of pouring the polymerizable composition into a gap between the polarizing film and the mold; and a step of starting polymerization of the polymerizable composition at 30° C. or lower to polymerize and cure the composition and laminating a layer formed of a polyurethane resin on at least one surface of the polarizing film.

[12] A plastic polarizing lens obtained by the method according to [11].

EFFECT OF THE INVENTION

With the polymerizable composition for an optical material according to the present invention, a urethane molded product can be obtained, in which the workability during preparation or casting is superior, the heat resistance, the strength (three-point bending test), and the tinting properties are also superior, and striation and color fading caused by solvent cleaning after tinting are suppressed. That is, a urethane molded product having a good balance between the properties can be obtained. Such a urethane molded product is suitably used as various optical materials in which high transparency is required.

BRIEF DESCRIPTION OF THE DRAWING

FIG. 1 is a $^1$H-NMR chart of propylene oxide adducts of trimethylolpropane.

DESCRIPTION OF EMBODIMENTS

Hereinafter, a polymerizable composition for an optical material according to an embodiment of the present invention will be described using specific examples.

The polymerizable composition for an optical material according to the embodiment includes: (A) one or more isocyanates having two or more isocyanato groups that contains an aromatic isocyanate (hereinafter, simply referred to as "isocyanate (A)"); (B) one or more alcohols having two or more hydroxyl groups (hereinafter, simply referred to as "alcohol (B)"); and (C) an acid phosphate represented by the formula (1) (hereinafter, simply referred to as "acid phosphate (C)").

Isocyanate (A)

The isocyanate (A) is one or more isocyanates having two or more isocyanato groups and contains an aromatic isocyanate. The aromatic isocyanate is isocyanate in which two or more isocyanato groups are directly bonded to an aromatic ring, and specific examples thereof include tolylene diisocyanate, 4,4'-diphenyl methane diisocyanate, 2,4'-diphenyl methane diisocyanate, and phenylene diisocyanate. Among these, one kind may be used alone, or two or more kinds may be used in combination. The isocyanate (A) contains the aromatic isocyanate in an amount of 80 mass % to 100 mass %.

It is preferable that the aromatic isocyanate according to the embodiment contains tolylene diisocyanate, and it is more preferable that the aromatic isocyanate according to the embodiment consists of tolylene diisocyanate. The tolylene diisocyanate is one or more isocyanates selected from 2,4-tolylene diisocyanate and 2,6-tolylene diisocyanate. Examples of the tolylene diisocyanate include 2,4-tolylene diisocyanate, 2,6-tolylene diisocyanate, and a mixture of 2,4-tolylene diisocyanate and 2,6-tolylene diisocyanate. A dimer, a trimer, or a prepolymer may also be contained.

In the embodiment, it is preferable that the tolylene diisocyanate contains 2,4-tolylene diisocyanate. Specifically, 2,4-tolylene diisocyanate may be used alone, or a mixture of 2,4-tolylene diisocyanate and 2,6-tolylene diisocyanate may be used as the tolylene diisocyanate. When the mixture is used, a mixing ratio of 2,4-tolylene diisocyanate to 2,6-tolylene diisocyanate is more preferably within a range of 75:25 to 85:15.

In the embodiment, the isocyanate (A) may contain an isocyanate having two or more isocyanato groups in addition to the aromatic isocyanate. Examples of such an isocyanate include an aliphatic isocyanate, an alicyclic isocyanate, and a heterocyclic isocyanate.

Examples of the aliphatic isocyanate include hexamethylene diisocyanate, 2,2,4-trimethyl hexamethylene diisocyanate, 2,4,4-trimethyl hexamethylene diisocyanate, lysine diisocyanatomethyl ester, lysine triisocyanate, m-xylylene diisocyanate, α,α,α',α'-tetramethyl xylylene diisocyanate, bis(isocyanatomethyl)naphthalene, mesitylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, and bis(isocyanatomethylthio)ethane.

Examples of the alicyclic isocyanate include isophorone diisocyanate, bis(isocyanatomethyl)cyclohexane, dicyclohexyl methane diisocyanate, cyclohexane diisocyanate, methylcyclohexane diisocyanate, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, and 4,9-bis(isocyanatomethyl)tricyclodecane.

Examples of the heterocyclic isocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane.

Alcohol (B)

In the alcohol (B), a ratio of the molar number of a secondary hydroxyl group to the total molar number of primary and secondary hydroxyl groups is 50% or higher. The alcohol (B) may be formed of one alcohol in which the ratio of the molar number of a secondary hydroxyl group is 50% or higher, or may be formed of two or more compounds in which the ratio of the molar number of a secondary hydroxyl group is 50% or higher. In consideration of workability, the ratio of the molar number of a secondary hydroxyl group to the total molar number of primary and secondary hydroxyl groups is preferably 60% or higher and more preferably 70% or higher.

The ratio of the molar number of a secondary hydroxyl group can be calculated by proton nuclear magnetic resonance ($^1$H-NMR) spectroscopy. Chemical shifts of protons of a methylene group (—CH2-(OH)) and a methine group (—CH(R)—(OH)) in which hydroxyl groups are adjacent to each other broadly overlap each other and thus cannot be distinguished from each other. However, the protons are shifted downfield by esterifying the hydroxyl groups with a carboxylic acid having an electron attracting group such as trifluoroacetic acid, and protons of the methylene group and the methine group can be distinguished from each other. For example, by being esterified with trifluoroacetic anhydride, typically, the chemical shift of protons of the methine group is 5.3 ppm to 5.6 ppm, and the chemical shift of protons of the methylene group is 4.2 ppm to 4.5 ppm. Therefore, the ratio of the molar number of a secondary hydroxyl group can be calculated from integrated values of peaks thereof. When the integrated value of the chemical shift of 5.3 ppm to 5.6 ppm is represented by A, and when the integrated value of the chemical shift of 4.2 ppm to 4.5 ppm is represented by B, the ratio X of the molar number of a secondary hydroxyl group can be calculated from the following expression.

$$X=A/(A+B/2)\times 100$$

The alcohol (B) is one or more aliphatic or alicyclic alcohols, and specific examples thereof include linear or branched aliphatic alcohols, alicyclic alcohols, and alcohols obtained by adding ethylene oxide, propylene oxide, or ε-caprolactone to the above-described alcohols.

Examples of the linear or branched aliphatic alcohols include ethylene glycol, diethylene glycol, triethylene glycol, propylene glycol, dipropylene glycol, tripropylene glycol, 1,3-propanediol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentanediol, 3-methyl-1,5-pentanediol, 1,6-hexanediol, 2,5-hexanediol, glycerol, diglycerol, polyglycerol, trimethylolpropane, pentaerythritol, and di(trimethylolpropane).

Examples of the alicyclic alcohol include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, and 1,4-cyclohexanedimethanol.

Compounds obtained by adding ethylene oxide, propylene oxide, or ε-caprolactone to the above-described alcohols may be used. Examples of these compounds include ethylene oxide adducts of glycerol, ethylene oxide adducts of trimethylolpropane, ethylene oxide adducts of pentaerythritol, propylene oxide adducts of glycerol, propylene oxide adducts of trimethylolpropane, propylene oxide adducts of pentaerythritol, caprolactone-modified glycerol, caprolactone-modified trimethylolpropane, and caprolactone-modified pentaerythritol. The addition molar number of ethylene oxide, propylene oxide, or ε-caprolactone is preferably 0.7 mol to 3.0 mol and more preferably 0.7 mol to 2.0 mol with respect to 1 mol of the hydroxyl group in the alcohol.

In the embodiment, as the alcohol (B), it is preferable to use one or more compounds selected from ethylene glycol, diethylene glycol, triethylene glycol, propylene glycol, dipropylene glycol, tripropylene glycol, glycerol, diglycerol, polyglycerol, trimethylolpropane, pentaerythritol, di(trimethylolpropane), ethylene oxide adducts of glycerol, ethylene oxide adducts of trimethylolpropane, ethylene oxide adducts of pentaerythritol, propylene oxide adducts of glycerol, propylene oxide adducts of trimethylolpropane, and propylene oxide adducts of pentaerythritol.

It is more preferable to use one or more compounds selected from glycerol, diglycerol, trimethylolpropane, pentaerythritol, di(trimethylolpropane), ethylene oxide adducts of glycerol, ethylene oxide adducts of trimethylolpropane, ethylene oxide adducts of pentaerythritol, propylene oxide adducts of glycerol, propylene oxide adducts of trimethylolpropane, and propylene oxide adducts of pentaerythritol.

In the embodiment, it is particularly preferable that the alcohol (B) contains one or more compounds selected from propylene oxide adducts of glycerol, propylene oxide adducts of trimethylolpropane, and propylene oxide adducts of pentaerythritol.

In the propylene oxide adducts of glycerol, the addition molar number of propylene oxide is preferably 0.7 mol to 1.3 mol with respect to 1 mol of the hydroxyl group in the glycerol, and the hydroxyl value is preferably 520 mgKOH/g to 810 mgKOH/g and more preferably 580 mgKOH/g to 680 mgKOH/g. In the propylene oxide adducts of trimethylolpropane, the addition molar number of propylene oxide is preferably 0.8 mol to 1.3 mol with respect to 1 mol of the hydroxyl group in the trimethylolpropane, and the hydroxyl value is preferably 460 mgKOH/g to 600 mgKOH/g and more preferably 520 mgKOH/g to 580 mgKOH/g. The hydroxyl value can be obtained using a well-known method.

Acid Phosphate (C)

The acid phosphate (C) is represented by the formula (1) and is used as a release agent in the related art. In the embodiment, the acid phosphate (C) is also used as a urethanization catalyst.

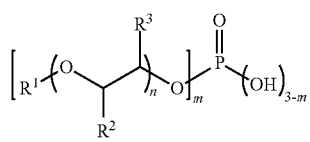
(1)

In the formula, m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group. The number of carbon atoms in symbol $[\ ]_m$ is preferably 4 to 20.

Examples of $R^1$ in the formula (1) include an organic residue derived from a linear aliphatic compound such as methane, ethane, propane, butane, pentane, hexane, heptane, octane, nonane, decane, undecane, dodecane, tetradecane, or hexadecane; an organic residue derived from a branched aliphatic compound such as 2-methylpropane, 2-methylbutane, 2-methylpentane, 3-methylpentane, 3-ethylpentane, 2-methylhexane, 3-methylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, or 4-propyloctane; and an organic residue derived from an alicyclic compound such as cyclopentene, cyclohexane, 1,2-dimethylcyclohexane, 1,3-dimethylcyclohexane, or 1,4-dimethylcyclohexane. $R^1$ is not limited to these exemplary compounds and may be a mixture thereof.

In addition, in the formula (1), it is preferable that n represents 0, and the compound may be represented by formula (2).

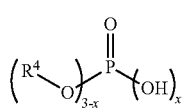
(2)

In the formula (2), x represents an integer of 1 or 2, and $R^4$ represents an alkyl group having 8 to 16 carbon atoms.

Examples of $R^4$ in the formula (2) include an organic residue derived from a linear aliphatic compound such as octane, nonane, decane, undecane, dodecane, tetradecane, or hexadecane; an organic residue derived from a branched aliphatic compound such as 2-ethylhexane, 3-ethylhexane, 2-methylheptane, 3-methylheptane, 4-methylheptane, 3-ethylheptane, 4-ethylheptane, 4-propylheptane, 2-methyloctane, 3-methyloctane, 4-methyloctane, 3-ethyloctane, 4-ethyloctane, or 4-propyloctane; and an organic residue derived from an alicyclic compound such as 1,2-dimethylcyclohexane, 1,3-dimethylcyclohexane, or 1,4-dimethylcyclohexane. $R^4$ is not limited to these exemplary compounds and may be a mixture thereof.

As the acid phosphate (C), for example, ZelecUN manufactured by Stepan Company, an internal release agent for MR manufactured by Mitsui Chemicals inc., JP series manufactured by Johoku Chemical Co., Ltd., PHOSPHANOL series manufactured by Toho Chemical Industry Co., Ltd., or AP and DP series manufactured by Daihachi Chemical Industry Co., Ltd may be used. Among these, ZelecUN manufactured by Stepan Company or an internal release agent for MR manufactured by Mitsui Chemicals inc. is more preferably used.

The addition amount of the acid phosphate (C) is preferably 0.1 parts by weight to 3.0 parts by weight and more preferably 0.2 parts by weight to 2.0 parts by weight with respect to 100 parts by weight of a total weight of the isocyanate (A) and the alcohol (B).

In general, as a catalyst of a urethane resin, for example, a tertiary amine, an amine carboxylate, or a metal catalyst may be used. However, when these catalysts are used as a catalyst of the polymerizable composition for an optical material according to the embodiment, the reactivity increases, and the viscosity of the polymerizable composition for an optical material during casting excessively increases. As a result, the workability deteriorates, and striation may occur in the obtained molded product. In the embodiment, it is preferable that a specific cyclic amine and a specific acid phosphate are used in combination because the workability is superior during preparation or casting, striation can be efficiently suppressed, a molded product formed of the isocyanate and the alcohol according to the embodiment can be applied to spectacle lenses, and thus the workability and the quality can be secured.

Examples of the specific cyclic amine include imidazoles such as imidazole, 1,2-dimethylimidazole, benzyl methylimidazole, and 2-ethyl-4-imidazole; and hindered amines which are 1,2,2,6,6-piperidine compounds such as 1,2,2,6,6-pentamethyl-4-piperidinol, 1,2,2,6,6-pentamethyl-4-hydroxyethyl-4-piperidinol, methyl-1,2,2,6,6-pentamethyl-4-piperidinyl sebacate, a mixture of methyl-1,2,2,6,6-pentamethyl-4-piperidinyl sebacate and bis(1,2,2,6,6-pentamethyl-4-piperidinyl) sebacate, bis(1,2,2,6,6-pentamethyl-4-piperidinyl) sebacate, bis(2,2,6,6-tetramethyl-1-(octyloxy)-4-piperidinyl) sebacate, bis(1,2,2,6,6-pentamethyl-4-piperidinyl)-[[3,5-bis(1,1-dimethyl ethyl)]-4-hydroxyphenyl]methyl]butyl malonate, and tetrakis(1,2,2,6,6-pentamethyl-4-piperidinyl)butane-1,2,3,4-tetracarboxylate.

As the cyclic amine, for example, imidazoles or hindered amines are preferably used, and hindered amines are more preferably used.

The hindered amine is used as a light stabilizer, and examples of a commercially available product thereof include Lowilite 76 and Lowilite 92 manufactured by Chemtura Corporation; Tinuvin 144, Tinuvin 292, and Tinuvin 765 manufactured by BASF; ADEKA STAB LA-52 and LA-72 manufactured by ADEKA Corporation; and JF-95 manufactured by Johoku Chemical Co., Ltd.

Components Other than Components (A) to (C)

According to the purpose, the polymerizable composition for an optical material according to the embodiment may contain additives such as a light stabilizer, an ultraviolet absorber, an antioxidant, an anti-coloring agent, a dye, and a resin modifier.

As the light stabilizer, a hindered amine compound can be used. Examples of a commercially available product of the hindered amine compound include Lowilite 76 and Lowilite 92 manufactured by Chemtura Corporation; Tinuvin 144, Tinuvin 292, and Tinuvin 765 manufactured by BASF; ADEKA STAB LA-52 and LA-72 manufactured by ADEKA Corporation; and JF-95 manufactured by Johoku Chemical Co., Ltd.

The addition amount of the hindered amine compound is preferably 0.1 parts by weight to 2.0 parts by weight and more preferably 0.2 parts by weight to 1.5 parts by weight with respect to 100 parts by weight of a total weight of the isocyanate (A) and the alcohol (B). Within the above-described range, a molded product in which color is superior and striation is suppressed can be obtained.

As the ultraviolet absorber, a benzotriazole-based compound, a triazine-based compound, a benzophenone-based compound, or a benzoate-based compound is preferable, and a benzotriazole-based compound is more preferable. The addition amount of the ultraviolet absorber is preferably 0.05 parts by weight to 2.0 parts by weight and more preferably 0.05 parts by weight to 1.5 parts by weight with respect to 100 parts by weight of a total weight of the isocyanate (A) and the alcohol (B).

In the embodiment, a molar ratio of the hydroxyl group in the alcohol to isocyanato groups in the isocyanate is within a range of 0.8 to 1.2, preferably within a range of 0.85 to 1.15, and more preferably within a range of 0.9 to 1.1. Within the above-described range, an optical material, in particular, a resin which is suitably used as a spectacle lens can be obtained.

When thiol is added to the polymerizable composition for an optical material according to the embodiment as an additive, light resistance significantly deteriorates. When a primary amine or a secondary amine is added as the amine, a reaction with the isocyanate according to the embodiment is rapidly progressed. Therefore, the viscosity of the polymerizable composition for an optical material excessively increases during casting, the workability deteriorates, and striation occurs in the obtained molded product. Problems caused during addition of a metal catalyst are as described above. As a metal catalyst used for a thiourethane resin, an organic tin compound is used in many cases. However, according to the polymerizable composition for an optical material according to the embodiment, a resin for spectacle lenses can be manufactured without an organic tin compound which is harmful to the human body due to its high toxicity and environmental hormone. Therefore, the safety of a molded product obtained during the manufacturing process is higher.

In the embodiment, from the viewpoints of obtaining superior workability during preparation or casting and efficiently suppressing striation, the following combination of the isocyanate (A) and the alcohol (B) is preferably used: the isocyanate (A) is tolylene diisocyanate; and the alcohol (B) contains one or more compounds selected from propylene oxide adducts of glycerol, propylene oxide adducts of trimethylolpropane, and propylene oxide adducts of pentaerythritol.

With the polymerizable composition for an optical material according to the present invention, a urethane molded product can be obtained, in which the workability during preparation or casting is superior, the heat resistance, the strength (three-point bending test), and the tinting properties are also superior, and striation and color fading caused by solvent cleaning after tinting are suppressed. Further, a urethane molded product having superior light resistance, and impact resistance (falling ball test according to FDA regulations) can be obtained. That is, according to the embodiment, a urethane molded product having a good balance between the properties can be obtained.

[Usage]

The urethane molded product according to the embodiment can be obtained in various shapes by changing a mold during cast polymerization. The urethane molded product according to the embodiment has high transparency and can be used for various applications as an optical resin, for example, a plastic lens, a camera lens, a light emitting diode (LED), prisms, an optical fiber, an information recording substrate, a filter, and a light emitting diode. In particular, the urethane molded product according to the embodiment is suitably used as an optical material or an optical element such as a plastic lens, a camera lens, or a light emitting diode.

Examples of the plastic lens include a plastic spectacle lens formed of a polyurethane resin and a plastic polarizing lens in which a layer formed of a polyurethane resin is laminated on at least one surface of a polarizing film.

[Method of Manufacturing Urethane Molded Product]

A method of manufacturing a urethane molded product according to the embodiment includes: Step (1) of obtaining the polymerizable composition by mixing the alcohol (B) and the acid phosphate (C) with each other to obtain a mixture and then further mixing the mixture with the tolylene diisocyanate (A); Step (2) of casting the polymerizable composition into a casting mold; and Step (3) of starting polymerization of the polymerizable composition to polymerize the composition.

Step (1)

When the isocyanate (A) is mixed with the acid phosphate (C), a white solid material having low solubility may be precipitated. Therefore, when this mixture is polymerized as it is, the transparency of the obtained resin may deteriorate and may not be suitable for spectacle lenses. Accordingly, it is preferable that the alcohol (B) and the acid phosphate (C) are mixed first, and the isocyanate (A) is mixed with the mixture. As a result, the formation of the white solid material having low solubility is suppressed, and a molded product having superior transparency can be obtained.

In addition, the temperature during the mixing with the isocyanate (A) is preferably 30° C. or lower because the viscosity of the polymerizable composition for an optical material is suppressed, and a molded product can be manufactured without deterioration in workability at this temperature.

Step (2)

In this step, the polymerizable composition for an optical material according to the embodiment is cast into a mold (casting mold) held by a gasket, a tape, or the like. At this time, depending on the physical properties required for the obtained molded product, it is preferable to optionally perform a defoaming process under a reduced pressure or a filtering process such as pressurizing or depressurizing.

Step (3)

In this step, polymerization of the polymerizable composition for an optical material cast into the mold is started to polymerize the composition. The starting temperature of polymerization is preferably 30° C. or lower because the releasability after the polymerization is superior, and striation does not occur in the obtained molded product at this temperature. Polymerization conditions are not particularly limited because they significantly vary depending on the kinds of the isocyanate and the alcohol used, the shape of the mold, and the like. For example, the polymerization is performed at a temperature of about 0° C. to 140° C. for 1 hour to 48 hours.

A method of adding additives is not particularly limited because the preparation procedure varies depending on the kinds and amounts of the isocyanate (A), the alcohol (B), and the additives used. For example, the method is appropriately selected in consideration of the solubility of the additives, handleability, safety, convenience, and the like.

Optionally, the urethane molded product according to the embodiment may be subjected to a treatment such as annealing. The treatment temperature is typically within a range of 50° C. to 150° C., preferably 90° C. to 140° C., and more preferably 100° C. to 130° C.

In a plastic lens using the urethane molded product according to the embodiment, optionally, a coating layer may be formed on a single surface or both surfaces thereof. Examples of the coating layer include a primer layer, a hard coating layer, an anti-reflection layer, an anti-fog coating layer, an anti-fouling layer, and a water-repellent layer. These coating layers may be used individually, or a multilayer structure of plural coating layers may be used. When the coating layer is formed on both surfaces, the same coating layer or different coating layers may be formed on the respective surfaces.

These coating layers may be used in combination with various additives for various purposes: an ultraviolet absorber for protecting a lens and an eye from ultraviolet rays; an infrared absorber for protecting an eye from infrared rays; a light stabilizer or an antioxidant for improving the weather resistance of the lens; a dye or a pigment for improving the fashionability of the lens; and a photochromic dye, a photochromic pigment, an anti-static agent, and other well-known additives for improving the performance of the lens. For a layer which is coated by application, various leveling agents for improving the applicability may be used.

Typically, the primer layer may be formed between a hard coating layer described below and an optical lens. The primer layer is the coating layer for improving the adhesion between the hard coating layer and the lens which are formed thereon, and can improve impact resistance in some cases. The primer layer can be formed of any material as long as the material has high adhesion with the obtained optical lens. Typically, for example, a primer composition containing a urethane resin, an epoxy resin, a polyester resin, a melanin resin, polyvinyl acetal as a major component may be used. In the primer composition, an appropriate solvent which does not affect the lens may be used to adjust the viscosity of the composition. Of course, a solvent is not necessarily used.

The primer composition can be formed using any method such as a coating method or a dry method. When the coating method is used, a primer layer is formed by coating the lens with the primer composition using a well-known coating method such as spin coating or dip coating and then solidifying the primer composition. When the dry method is used, the primer layer is formed using a well-known dry method such as a CVD method or a vacuum deposition method. During the formation of the primer layer, in order to improve the adhesion, the surface of the lens may be optionally subjected to a pre-treatment such as an alkaline treatment, a plasma treatment, or an ultraviolet treatment.

The hard coating layer is the coating layer for imparting scratch resistance, abrasion resistance, moisture resistance, warm water resistance, heat resistance and weather resistance to the lens surface.

In general, the hard coating layer is formed of a hard coating composition containing an organic silicon compound having curability and one or more oxide fine particles of elements selected from the element group consisting of Si, Al, Sn, Sb, Ta, Ce, La, Fe, Zn, W, Zr, In, and Ti and/or one or more fine particles of composite oxides which are formed of two or more elements selected from the above element group.

It is preferable that the hard coating composition further contains at least one of amines, amino acids, metal acetylacetonate complexes, organic acid metal salts, perchloric acids, salts of perchloric acids, acids, metal chlorides and polyfunctional epoxy compounds, in addition to the above-described components. In the hard coating composition, an appropriate solvent which does not affect the lens may be used. Of course, a solvent is not necessarily used.

Typically, the hard coating layer is formed by coating the lens with the hard coating composition using a well-known coating method such as spin coating or dip coating and curing the hard coating composition. Examples of a curing method include a method of curing by thermal curing, or irradiation with energy beams such as ultraviolet rays or visible rays. In order to suppress the generation of interference fringes, a difference in refractive index between the hard coating layer and the lens is preferably within a range of ±0.1.

Typically, the anti-reflection layer is optionally formed on the hard coating layer. The anti-reflection layer is an inorganic or organic layer. When the anti-reflection layer is an inorganic layer, this inorganic layer is formed of an inorganic oxide such as $SiO_2$ or $TiO_2$ using a dry method such as a vacuum deposition method, a sputtering method, an ion plating method, an ion beam assisted deposition, or a CVD method. When the anti-reflection layer is an organic layer, this organic layer is formed of a composition containing an organic silicon compound and silica fine particles having internal pores using a wet method.

The anti-reflection layer is a single layer or multiple layers. When the anti-reflection layer is a single layer, it is preferable that the refractive index is lower than that of the hard coating layer by at least 0.1. In order to efficiently exhibit an anti-reflection function, it is preferable that the anti-reflection layer is multiple layers. In this case, a low-refractive-index film and a high-refractive-index film are alternately laminated. In this case, a difference in refractive index between the low-refractive-index film and the high-refractive-index film is preferably 0.1 or more. Examples of the high-refractive-index film include films of ZnO, $TiO_2$, $CeO_2$, $Sb_2O_5$, $SnO_2$, $ZrO_2$, and $Ta_2O_5$. Examples of the low-refractive-index film include a $SiO_2$ film.

Optionally, an anti-fog coating layer, an anti-fouling layer, and a water-repellent layer may be formed on the anti-reflection layer. Regarding a method of forming an anti-fog coating layer, an anti-fouling layer, and a water-repellent layer, the treatment method, the treatment material, and the like are not particularly limited as long as they do not adversely affect the anti-reflection function, and well-known methods such as an anti-fog coating method, an anti-fouling method, and a water repellent method and well-known materials can be used. Examples of the anti-fog coating method and the anti-fouling method include a method of covering the surface with a surfactant, a method of adding a hydrophilic film to the surface to impart water absorbency thereto, a method of covering the surface with fine convex and concave portions to improve water absorbency, a method of imparting water absorbency to the surface using photocatalytic activities, and a method of performing a super water-repellent treatment on the surface to prevent attachment of water droplets thereon. In addition, examples of the water-repellent treatment method include a method of forming a water-repellent layer by vapor deposition or sputtering of a fluorine-containing silane compound or the like; and a method of forming a water-repellent layer by dissolving a fluorine-containing silane compound in a solvent and coating the solution.

The plastic lens using the urethane molded product according to the embodiment may be tinted with a dye according to the purpose in order to impart fashionability, photochromic properties, and the like. The lens can be tinted using a well-known tinting method but typically is tinted using the following method.

In a typical method, a lens material having a predetermined finished optical surface is dipped (tinting step) in a dye solution in which a dye to be used is dissolved or is uniformly dispersed, and then the lens is optionally heated to fix the dye (annealing step after tinting). The dye used in the tinting step is not particularly limited as long as it is a well-known dye. Typically, an oil-soluble dye or a disperse dye can be used. A solvent used in the tinting step is not particularly limited as long as the dye used is soluble or is uniformly dispersible therein. In this tinting step, optionally a surfactant for dispersing the dye in the dye solution or a carrier for promoting tinting may be added. In the tinting step, the dye and the surfactant which is optionally added are dispersed in water or a mixture of water and an organic solvent to prepare a dye bath, and the optical lens is dipped in this dye bath at a predetermined temperature for a predetermined amount of time. The tinting temperature and time vary depending on a target color density. Typically, the tinting is performed at 120° C. or lower for several minutes to several hours at a dye concentration in the dye bath of 0.01 wt % to 10 wt %. In addition, when it is difficult to perform the tinting, the tinting is performed under pressure. In the annealing step which is optionally performed after tinting, the tinted lens material is heated. In the heating step, a remaining on the surface of the lens material which is tinted in the tinting step is removed using a solvent or the like, or the solvent is dried with wind. Next, the lens is held in a furnace such as an infrared heating furnace or a resistance heating furnace in air for a predetermined amount of time. In the annealing step after tinting, the color fading of the tinted lens material is prevented (anti-fading treatment), and moisture infiltrating into the lens material during the tinting is removed.

[Method of Manufacturing Plastic Polarizing Lens]

A method of manufacturing a plastic polarizing lens according to the embodiment includes the following steps:

Step (a): obtaining the polymerizable composition according to any one of claims 1 to 6 by mixing an alcohol (B) and an acid phosphate (C) with each other to obtain a mixture and then further mixing the mixture with one or more isocyanates (A) having two or more isocyanato groups that contains an aromatic isocyanate at 30° C. or lower;

Step (b): fixing a polarizing film to an inside of a lens casting mold in a state where at least one surface of the polarizing film is separated from the mold;

Step (c): pouring the polymerizable composition according to the embodiment into a gap between the polarizing film and the mold; and Step (d): starting polymerization of the polymerizable composition at 30° C. or lower to polymerize and cure the composition and laminating a layer formed of a polyurethane resin on at least one surface of the polarizing film.

Hereinafter, each step will be described in order. Since Step (a) can be performed in a similar way to Step (1) of the above-described "method of manufacturing a urethane molded product", the description thereof will not be repeated.

Step (b)

A polarizing film formed of thermoplastic polyester or the like is put into a space of a lens casting mold such that at least one film surface is parallel with a mold inner surface opposite thereto. A gap portion is formed between the polarizing film and the mold. The polarizing film may be shaped in advance.

Step (c)

Next, the polymerizable composition for an optical material according to the embodiment is poured into the gap portion between the mold and the polarizing film in the space of the lens casting mold.

Step (d)

Next, the lens casting mold with the polymerizable composition for an optical material poured and the polarizing film fixed is heated in a device capable of heating in an oven, water, or the like for several hours to several tens of hours according to a predetermined temperature program to cure and mold the polymerizable composition.

The temperature of polymerization curing is not particularly limited because the conditions vary depending on the composition of the polymerizable composition, the kind of a catalyst, the shape of the mold, and the like. For example, the polymerization curing is performed at a temperature of 0° C. to 140° C. for 1 hour to 48 hours.

After completion of the curing and molding, the product is extracted from the lens casting mold. As a result, a plastic polarizing lens according to the present invention in which a layer formed of a polyurethane resin is laminated on at least one surface of the polarizing film can be obtained.

In order to release strains generated by polymerization, it is preferable that the plastic polarizing lens according to the embodiment is heated to be annealed after being released from the mold.

In the plastic polarizing lens according to the embodiment, optionally, a coating layer may be formed on a single surface or both surfaces thereof. Similarly to the case of the plastic spectacle lens, examples of the coating layer include a primer layer, a hard coating layer, an anti-reflection layer, an anti-fog coating layer, an anti-fouling layer, and a water-repellent layer.

In addition, plastic lenses of eyeglasses may be stored in a state of being packed for a relatively long period of time, and there may be a problem in quality. For example, during the storage of the lenses, the shape thereof changes due to scratches or moisture absorption, or the colors of the left and right lenses change and are different from each other due to a difference in the storage period of the lenses.

In this case, this problem can be suppressed and improved using well-known packaging techniques (for example, Japanese Laid-open Patent Publication No. 2007-99313, Japanese Laid-open Patent Publication No. 2007-24998, and Japanese Laid-open Patent Publication No. H09-216674).

Specific examples of the packaging techniques include a method of sealing and storing a lens in a packaging material which is formed of a material having properties (gas barrier properties) of suppressing permeation of oxygen or oxygen and water vapor and is filled with inert gas; a method of sealing and storing a lens in a packaging material which is formed of a material having properties (gas barrier properties) of suppressing permeation of oxygen or oxygen and water vapor together with an oxygen absorber; and a method of sealing a lens in a vacuum.

As the oxygen absorber, a well-known one can be used, in which, for example, an oxygen absorbing composition which absorbs oxygen is packed in a packaging material having gas permeability. As the oxygen absorbing composition, for example, a composition which absorbs oxygen using an oxidation reaction of a reducing metal. Examples of the oxygen absorber using such a oxygen absorbing composition include a moisture-dependent oxygen absorber in which replenishment of moisture from an atmosphere is required during deoxidation; and a self-reacting oxygen absorber in which replenishment of moisture from an atmosphere is not required. When the self-reacting oxygen absorber is used, the oxygen absorber is preferably packed in a packaging material together with a desiccant (for example, silica gel). In addition, an oxygen absorber having a deoxidation function and a drying function at the same time may be used (for example, PHARMAKEEP (KD and KC type) manufactured by Mitsubishi Gas Company Inc.). In addition, an oxygen absorber which exhibits a deoxidation function in a dry atmosphere without the necessity of supplying moisture may be used. Examples of such an oxygen absorber include an oxygen absorber including a deoxidation component which is formed of a crosslinked polymer having an unsaturated carbon-carbon bond (for example, refer to Japanese Laid-open Patent Publication No. H11-70331); an oxygen absorber including activated metal, which is obtained by activating transition metal supported on a support, as a major component (for example, refer to Japanese Laid-open Patent Publication No. H08-38883); an oxygen absorber including activated magnesium, which is obtained by allowing a magnesium compound to be supported on a support and reducing the supported magnesium compound, as a major component (for example, refer to Japanese Laid-open Patent Publication No. 2001-37457); and an oxygen absorber including an oxygen absorbing composition in which a substance including a liquid hydrocarbon oligomer having an unsaturated group as a major component and including an oxygen absorption accelerating material is supported on a support (for example, refer to Japanese Laid-open Patent Publication No. H10-113555). Examples of a commercially available product include PHARMAKEEP (KH type) manufactured by Mitsubishi Gas Company Inc.

In addition, examples of the self-reacting oxygen absorber include an oxygen absorber disclosed in Japanese Examined Patent Application Publication No. S57-31449 in which a moisture donor is present such that moisture required for deoxidation is supplied therefrom.

The filling of inert gas and the sealing of a packaging material into a packaging material are performed by evacuating air from the packaging material and filling the packaging material with the inert gas so as to substitute the air inside the packaging material with the inert gas and, in this state, sealing an opening of the packaging material.

As the inert gas filling the inside of the packaging material, for example, nitrogen, argon, helium, or neon can be used. From the viewpoint of economical efficiency, nitrogen gas is preferably used.

In order to prevent deterioration such as lens deformation caused by moisture and to remove moisture in air remaining in the packaging material, a desiccant (for example, silica gel) may be sealed in the packaging material together with a lens.

Preferable examples of the packaging material include a material, such as aluminum having low oxygen permeability, including an metal foil layer which is formed of a material capable of suppressing permeation of at least oxygen.

Examples

Hereinafter, the present invention will be described in detail using examples.

A ratio of the molar number of a secondary hydroxyl group to the total molar number of primary and secondary hydroxyl groups contained in an alcohol was calculated by proton nuclear magnetic resonance spectroscopy $^1$H-NMR (400 MHz). Measurement conditions were as follows.
  Device: ECP-400P (manufactured by JEOL Ltd.)
  Cumulative number: 16 times
  Observation range: 8000 Hz
  Measurement temperature: room temperature (21° C. to 22° C.)
  Sequence: single pulse
  Pulse width: 5.75 μs (45° pulse)
  Repetition time: 7.2 s
  30 mg to 35 mg of alcohol was diluted with deuterated chloroform, and 0.1 ml of trifluoroacetic anhydride was added thereto, followed by reaction at 20° C. to 25° C. for 1 hour. The completion of the reaction was confirmed. Next, this reaction liquid was subjected to $^1$H-NMR spectroscopy, and the ratio of the molar number of a secondary hydroxyl group was calculated from the following expression.

$$X = A/(A+B/2) \times 100$$

X: the ratio of the molar number of a secondary hydroxyl group
A: an integrated value of a chemical shift of 5.3 ppm to 5.6 ppm (chemical shift of protons of a methine group)
B: an integrated value of a chemical shift of 4.2 ppm to 4.5 ppm (chemical shift of protons of a methylene group)

In a resin performance test, refractive index, Abbe number, specific gravity, transparency, striation, heat resistance, tinting properties, color fading caused by organic solvent cleaning after tinting, and strength were evaluated using the following method.
  Refractive index (ne), Abbe number (ve): the measurement was performed using a Pulfrich refractometer at 20° C.
  Specific gravity: the measurement was performed using Archimedes' principle.
  Transparency: the obtained lens was irradiated with light using a projector at a dark place to determine whether or not fogging, an opaque material, or elution of an adhesive component from a tape was observed by visual inspection. A case where fogging, an opaque material, or elution of an adhesive component from a tape was not observed was evaluated as "Transparent", and a case where fogging, an opaque material, or elution of an adhesive component from a tape was observed was evaluated as "Non-Transparent".
  Striation: The obtained lens was projected using a high-pressure mercury lamp, and a case where strain was not observed in the lens was evaluated as "No Striation Observed", and a case where strain was observed in the lens was evaluated as "Striation Observed"
  Heat resistance: the glass transition temperature Tg was measured using the TMA penetration method (a load of 50 g, pin point: 0.5 mmφ, temperature increase rate: 10° C./min)
  Tinting Properties: 1.0 g of "FSP Red E-A" (manufactured by Futaba Industrial Co., Ltd.), 1.0 g of "FSP Yellow P-E" (manufactured by Futaba Industrial Co., Ltd.), 4.0 g of "FSP Blue AUL-S" (manufactured by Futaba Industrial Co., Ltd.), 28.2 g of "Nicca Sun Salt #7000" (manufactured by Nicca Chemical Co., Ltd.), and 8.0 g of "DK-CN" (manufactured by Daiwa Chemical Industries Co., Ltd.) were added to 3000 g of pure water to prepare a dye dispersion. A resin having a thickness of 9 mm was dipped in this dye dispersion at 95° C. for 5 minutes to be tinted. The transmittance (% T) of the tinted resin at 638 nm was measured.

Color fading caused by organic solvent cleaning after tinting: the tinted resin was washed with methanol, and the transmittance (% T) thereof at 638 nm was measured again to obtain a difference in transmittance before and after the cleaning.

Strength: the maximum point stress (N/mm$^2$) was measured using an Autograph (Model: AGS-J, manufactured by Shimadzu Corporation) in a three-point bending test under a constant crosshead speed condition (1.2 mm/min).

Example 1

52.9 g of a propylene oxide adduct of trimethylolpropane (Desmophen 4011T, manufactured by Bayer AG; ratio of the molar number of a secondary hydroxyl group obtained using the above-described measurement method: 70%), 0.8 g of ZelecUN (manufactured by Stepan Company; acid phosphate), and 0.4 g of TINUVIN 292 (manufactured by BASF; light stabilizer) were mixed and dissolved to prepare a uniform solution. 1.50 g of a ultraviolet absorber (Viosorb 583, manufactured by Kyodo Chemical Co., Ltd.) was mixed with and dissolved in 47.1 g of a mixture of 2,4-tolylene diisocyanate and 2,6-tolylene diisocyanate to prepare a uniform solution. The respective solutions were mixed with each other at 20° C., and the mixture was defoamed at 400 Pa and then was cast into a mold. The mold was put into a polymerization oven and was slowly heated to 15° C. to 120° C. for 24 hours to polymerize the mixture. After completion of the polymerization, the mold was extracted from the oven, and the product was released from the mold. The releasability was satisfactory, and the chipping of the mold was not observed. The obtained molded product was further annealed at 120° C. for 2 hours. The obtained molded product was transparent, the refractive index (ne) was 1.55, the Abbe number (ve) was 34, the specific gravity was 1.20, Tg was 100° C. or higher, and the molded product was suitable for an optical material. The results are shown in Table-1.

In addition, a $^1$H-NMR chart of propylene oxide adducts of trimethylolpropane is illustrated in FIG. 1. In FIG. 1, "A" represents a peak of a chemical shift of 5.3 ppm to 5.6 ppm, and "B" represents a peak of a chemical shift of 4.2 ppm to 4.5 ppm.

Examples 2 to 9

Molded products were obtained with the same method as that of Example 1, except that the isocyanate and the alcohol were changed to the composition shown in Table-1. The results are shown in Table-1.

Comparative Example 1

We had tried to obtain a molded product with the same method as that of Example 1, except that, as described in Japanese Laid-open Patent Publication No. S57-136601, a mixture of 2,4-tolylene diisocyanate and 2,6-tolylene diisocyanate was used as the isocyanate; a mixture of trimethylolpropane and 1,4-cyclohexanedimethanol (ratio of the molar number of a secondary hydroxyl group obtained using the above-described measurement method: 0%) was used as the alcohol; and the composition thereof was as shown in Table-1. The isocyanate and the alcohol were mixed at 20° C. but were not able to be uniformly dissolved. Therefore, the mixture was slowly heated under stirring, and it was confirmed that the isocyanate and the alcohol were uniformly dissolved at 70° C. However, after 2 minutes from the uniform dissolution, white smoke was emitted, heat was rapidly generated, and the mixture was cured. Therefore, the composition was not able to be cast into a mold. The results are shown in Table-1.

Comparative Example 2

We had tried to obtain a molded product with the same method as that of Example 1, except that a mixture of 2,4-tolylene diisocyanate and 2,6-tolylene diisocyanate was used as the isocyanate; 1,4-butanediol (ratio of the molar number of a secondary hydroxyl group obtained using the above-described measurement method: 0%) was used as the alcohol; and the composition thereof was as shown in Table-1. The isocyanate and the alcohol were mixed at 20° C. After several tens of seconds, it was confirmed that the isocyanate and the alcohol were uniformly dissolved. However, as the internal temperature approached about 80° C. after 2 minutes, rapid heat generation was observed. Immediately after the heat generation, white smoke was emitted, and the mixture was cured. Therefore, the composition was not able to be cast into a mold. The results are shown in Table-1.

Comparative Example 3

We had tried to obtain a molded product with the same method as that of Example 1, except that a mixture of 2,4-tolylene diisocyanate and 2,6-tolylene diisocyanate was used as the isocyanate; glycerol (ratio of the molar number of a secondary hydroxyl group obtained using the above-described measurement method: 32%) was used as the alcohol; and the composition thereof was as shown in Table-1. The isocyanate and the alcohol were mixed at 20° C. but were not able to be uniformly dissolved. Therefore, the mixture was slowly heated under stirring, and it was confirmed that the isocyanate and the alcohol were uniformly dissolved at 60° C. However, immediately after the uniform dissolution, white smoke was emitted, heat was rapidly generated, and the mixture was cured. Therefore, the composition was not able to be cast into a mold. The results are shown in Table-1.

Comparative Example 4

We had tried to obtain a molded product with the same method as that of Example 1, except that a mixture of 2,4-tolylene diisocyanate and 2,6-tolylene diisocyanate was used as the isocyanate; a mixture of 29.7 g of an ethylene oxide adduct of pentaerythritol and 12.7 g of dipropylene glycol (ratio of the molar number of a secondary hydroxyl group obtained using the above-described measurement method: 35%) was used as the alcohol; and the composition thereof was as shown in Table-1. The isocyanate and the alcohol were mixed at 20° C. After 9 minutes, it was confirmed that the isocyanate and the alcohol were uniformly dissolved. However, immediately after the uniform dissolution, white smoke was emitted, heat was rapidly generated, and the mixture was cured. Therefore, the composition was not able to be cast into a mold. The results are shown in Table-1.

Comparative Example 5

We had tried to obtain a molded product with the same method as that of Example 1, except that 4,4'-methylenebis(cyclohexylisocyanate) was used as the isocyanate; a mixture of 25.8 g of an propylene oxide adduct of trimethylolpropane, 2.8 g of trimethylolpropane, 2.0 g of di(trimethylolpropane), and 8.0 g of tripropylene glycol (ratio of the molar number of a secondary hydroxyl group obtained using the above-described measurement method: 54%) was used as the alcohol; and the composition thereof was as shown in Table-1. The isocyanate and the alcohol were mixed at 20° C. but were not able to be uniformly dissolved. Therefore, the mixture was slowly heated under stirring, and it was confirmed that the isocyanate and the alcohol were uniformly dissolved at 60° C. Next, a molded product was obtained using the same method as that of Example 1. The results are shown in Table-1.

Comparative Example 6

We had tried to obtain a molded product with the same method as that of Example 1, except that 4,4'-methylenebis(cyclohexylisocyanate) was used as the isocyanate; a propylene oxide adduct of glycerol (ratio of the molar number of a secondary hydroxyl group obtained using the above-described measurement method: 88%) was used as the alcohol; and the composition thereof was as shown in Table-1. The isocyanate and the alcohol were mixed at 20° C. but were not able to be uniformly dissolved. Therefore, the mixture was slowly heated under stirring, and it was confirmed that the isocyanate and the alcohol were uniformly dissolved at 60° C. Next, a molded product was obtained using the same method as that of Example 1. The results are shown in Table-1.

TABLE 1

| Example | Isocyanate | Active Hydrogen Compound | Ratio of Molar Number of Secondary Hydroxyl Group | Refractive Index (ne) | Abbe Number (ve) | Specific Gravity |
|---|---|---|---|---|---|---|
| Example 1 | i-1 (47.1 g) | A-1 (52.9 g) | 70 | 1.55 | 34 | 1.20 |
| Example 2 | i-2 (47.1 g) | A-1 (52.9 g) | 70 | 1.55 | 34 | 1.20 |
| Example 3 | i-1 (51.4 g) | A-1 (32.5 g), A-2 (3.5 g), A-3 (2.5 g), A-4 (10.1 g) | 54 | 1.55 | 33 | 1.21 |
| Example 4 | i-1 (59.0 g) | A-1/A-5/A-6 (28.7 g/8.2 g/4.1 g) | 52 | 1.57 | 31 | 1.26 |
| Example 5 | i-1 (45.6 g) | A-1/A-7 (49.0 g/5.4 g) | 66 | 1.55 | 34 | 1.20 |
| Example 6 | i-1 (50.8 g) | A-8 (49.2 g) | 88 | 1.55 | 33 | 1.23 |
| Example 7 | i-1 (48.9 g) | A-8/A-9 (46.0 g/5.1 g) | 85 | 1.55 | 33 | 1.23 |
| Example 8 | i-1 (57.6 g) | A-10/A-11 (21.2 g/21.2 g) | 52 | 1.57 | 31 | 1.26 |
| Example 9 | i-1 (46.2 g) | A-12 (53.8 g) | 82 | 1.55 | 34 | 1.21 |
| Comparative Example 1 | i-1 (59.9 g) | A-2/A-13 (15.6 g/24.5 g) | 0 | Composition was Cured During Preparation and Thus was Not Able to Be Cast into Mold | | |
| Comparative Example 2 | i-1 (67.0 g) | A-14 (33.0 g) | 0 | Composition was Cured During Preparation and Thus was Not Able to Be Cast into Mold | | |
| Comparative Example 3 | i-1 (74.9 g) | A-5 (25.1 g) | 32 | Composition was Cured During Preparation and Thus was Not Able to Be Cast into Mold | | |
| Comparative Example 4 | i-1 (57.6 g) | A-10/A-11 (29.7 g/12.7 g) | 35 | Composition was Cured During Preparation and Thus was Not Able to Be Cast into Mold | | |
| Comparative Example 5 | i-3 (61.4 g) | A-1 (25.8 g), A-2 (2.8 g), A-3 (2.0 g), A-4 (8.0 g) | 54 | 1.51 | 54 | 1.11 |
| Comparative Example 6 | i-3 (60.8 g) | A-8 (39.2 g) | 88 | 1.51 | 50 | 1.13 |

| Example | Transparency | Striation | Heat Resistance Tg (° C.) | Tinting Properties Transmittance After Tinting (% T) | Color Fading of Tinted Lens Caused by Cleaning Agent Difference (% T) in Transmittance Before and After Cleaning | Strength Maximum Point Stress in Three-Point Bending Test (N/mm$^2$) |
|---|---|---|---|---|---|---|
| Example 1 | Transparent | Not Observed | 109 | 8 | 0.4 | 166 |

TABLE 1-continued

| | | | | | | |
|---|---|---|---|---|---|---|
| Example 2 | Transparent | Not Observed | 110 | 10 | 0.4 | 168 |
| Example 3 | Transparent | Not Observed | 109 | 11 | 0.4 | 170 |
| Example 4 | Transparent | Not Observed | 135 | 13 | 0.7 | 170 |
| Example 5 | Transparent | Not Observed | 106 | 7 | 0.7 | 164 |
| Example 6 | Transparent | Not Observed | 118 | 17 | 0.6 | 188 |
| Example 7 | Transparent | Not Observed | 109 | 8 | 0.1 | 160 |
| Example 8 | Transparent | Not Observed | 110 | 14 | 0.6 | 201 |
| Example 9 | Transparent | Not Observed | 112 | 20 | 0.6 | 172 |
| Comparative Example 1 | Composition was Cured During Preparation and Thus was Not Able to Be Cast into Mold | | | | | |
| Comparative Example 2 | Composition was Cured During Preparation and Thus was Not Able to Be Cast into Mold | | | | | |
| Comparative Example 3 | Composition was Cured During Preparation and Thus was Not Able to Be Cast into Mold | | | | | |
| Comparative Example 4 | Composition was Cured During Preparation and Thus was Not Able to Be Cast into Mold | | | | | |
| Comparative Example 5 | Transparent | Not Observed | 93 | 10 | 3.5 | 114 |
| Comparative Example 6 | Transparent | Not Observed | 98 | 9 | 2.6 | 130 | i-1: mixture of 2,4-tolylene diisocyanate and 2,6-tolylene diisocyanate i-2: 2,4-tolylene diisocyanate i-3: 4,4'-methylene-bis(cyclohexyl isocyanate)

A-1: propylene oxide adduct of trimethylolpropane (Desmophen 4011T, manufactured by Bayer AG)

A-2: trimethylolpropane (Product No: 10480, manufactured by Tokyo Chemical Industry Co., Ltd.)

A-3: di(trimethylolpropane) (Product No: 416134, manufactured by Sigma-Aldrich Co., LLC.)

A-4: tripropylene glycol (Product No: 10523, manufactured by Tokyo Chemical Industry Co., Ltd.)

A-5: glycerol (Product No: 075-00616, manufactured by Wako Pure Chemical Industries Ltd.)

A-6: diglycerol (Product No: T0119, manufactured by Tokyo Chemical Industry Co., Ltd.)

A-7: ethylene oxide adduct of trimethylolpropane (Product No: 409782, manufactured by Sigma-Aldrich Co., LLC., average molecular weight: about 730)

A-8: propylene oxide adduct of glycerol (Product No: 410284, manufactured by Sigma-Aldrich Co., LLC., average molecular weight: about 266)

A-9: ethylene oxide adduct of glycerol (Product No: 441864, manufactured by Sigma-Aldrich Co., LLC., average molecular weight: about 1000)

A-10: ethylene oxide adduct of pentaerythritol (Product No: 416150, manufactured by Sigma-Aldrich Co., LLC., average molecular weight: about 270)

A-11: dipropylene glycol (Product No: D0933, manufactured by Tokyo Chemical Industry Co., Ltd.)

A-12: propylene oxide adduct of pentaerythritol (Product No: 418749, manufactured by Sigma-Aldrich Co., LLC., average molecular weight: about 428)

A-13: 1,4-cyclohexanedimethanol (Product No: C0479, manufactured by Tokyo Chemical Industry Co., Ltd.)

A-14: 1,4-butanediol (Product No: B0680, manufactured by Tokyo Chemical Industry Co., Ltd.)

As shown in Comparative Examples 1 to 4, when the ratio of the molar number of a secondary hydroxyl group to the total molar number of primary and secondary hydroxyl groups contained in the alcohol (B) was lower than 50%, heat was rapidly generated during the preparation of the composition, and the composition was cured. Therefore, the composition was not able to be cast into the mold, and a molded product was not able to be obtained. In addition, as shown in Comparative Examples 5 and 6, even when the ratio of the molar number of a secondary hydroxyl group was 50% or higher, in a case where the aromatic isocyanate was not contained, the heat resistance was low, the color fading caused by solvent cleaning after tinting was observed, and the strength (three-point bending test) was low.

On the other hand, it was clearly found that, with the polymerizable composition for an optical material according to the present invention, a urethane molded product can be obtained, in which the workability during preparation or casting is superior, the heat resistance, the strength (three-point bending test), and the tinting properties are also superior, and striation and color fading caused by solvent cleaning after tinting are suppressed. That is, a urethane molded product having a good balance between the properties can be obtained.

A urethane molded product obtained from the polymerizable composition for an optical material according to the present invention can be suitably used as various optical materials in which high transparency is required, in particular, for spectacle lenses.

This application claims priority based on Japanese Patent Application No. 2012-255568, filed on Nov. 21, 2012, and Japanese Patent Application No. 2013-063478, filed on Mar. 26, 2013, the entire contents of which are incorporated by reference.

The present invention can adopt the following aspects.

[1] A polymerizable composition including:

(A) an isocyanate that contains an aromatic isocyanate;

(B) an alcohol; and (C) an acid phosphate represented by the following formula (1):

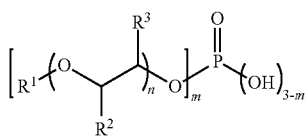

(in the formula, m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group),
in which a ratio of the molar number of a secondary hydroxyl group to the total molar number of all the hydroxyl groups contained in the alcohol (B) is 50% or higher.

[2] The polymerizable composition according to [1],
in which the alcohol (B) is one or more compounds selected from glycerol, diglycerol, trimethylolpropane, pentaerythritol, di(trimethylolpropane), ethylene oxide adducts of glycerol, ethylene oxide adducts of trimethylolpropane, ethylene oxide adducts of pentaerythritol, propylene oxide adducts of glycerol, propylene oxide adducts of trimethylolpropane, and propylene oxide adducts of pentaerythritol.

[3] The polymerizable composition according to [1] or [2],
in which the alcohol (B) contains one or more compounds selected from propylene oxide adducts of glycerol, propylene oxide adducts of trimethylolpropane, and propylene oxide adducts of pentaerythritol.

[4] The polymerizable composition according to any one of [1] to [3],
in which the aromatic isocyanate is 2,4-tolylene diisocyanate or a mixture of 2,4-tolylene diisocyanate and 2,6-tolylene diisocyanate.

[5] The polymerizable composition according to any one of [1] to [4],
in which an amount of the acid phosphate (C) is 0.1 parts by weight to 3.0 parts by weight with respect to 100 parts by weight of a total weight of the isocyanate (A) and the alcohol (B).

[6] The polymerizable composition according to any one of [1] to [5], further including:
a hindered amine compound,
in which an amount of the hindered amine compound is 0.1 parts by weight to 2.0 parts by weight with respect to 100 parts by weight of a total weight of the isocyanate (A) and the alcohol (B).

[7] A method of manufacturing a molded product including:
a step of obtaining the polymerizable composition according to [1] by mixing an alcohol (B) and an acid phosphate (C) with each other to obtain a mixture and then further mixing the mixture with an isocyanate (A) that contains an aromatic isocyanate at 30° C. or lower;
a step of casting the polymerizable composition into a casting mold; and
a step of starting polymerization of the polymerizable composition at 30° C. or lower to polymerize the composition.

[8] A molded product obtained using the method according to [7].

[9] An optical material formed by the molded product according to [8].

[10] A plastic lens formed by the optical material according to [9].

The invention claimed is:

1. A polymerizable composition for an optical material comprising:
   (A) one or more isocyanates having two or more isocyanato groups that contains an aromatic isocyanate;
   (B) one or more alcohols having two or more hydroxyl groups; and
   (C) an acid phosphate represented by the following formula (1):

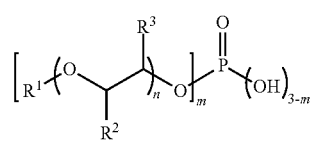

wherein m represents an integer of 1 or 2, n represents an integer of 0 to 18, $R^1$ represents an alkyl group having 1 to 20 carbon atoms, and $R^2$ and $R^3$ each independently represent a hydrogen atom, a methyl group, or an ethyl group,
wherein a ratio of the molar number of a secondary hydroxyl group to the total molar number of primary and secondary hydroxyl groups contained in the alcohol (B) is 50% or higher, and
wherein the alcohol (B) is one or more compounds selected from propylene oxide adducts of glycerol, propylene oxide adducts of trimethylolpropane, and propylene oxide adducts of pentaerythritol.

2. The polymerizable composition for an optical material according to claim 1,
wherein the aromatic isocyanate is 2,4-tolylene diisocyanate or a mixture of 2,4-tolylene diisocyanate and 2,6-tolylene diisocyanate.

3. The polymerizable composition for an optical material according to claim 1,
wherein an amount of the acid phosphate (C) is 0.1 parts by weight to 3.0 parts by weight with respect to 100 parts by weight of a total weight of the isocyanate (A) and the alcohol (B).

4. The polymerizable composition for an optical material according to claim 1, further comprising:
a hindered amine compound,
wherein an amount of the hindered amine compound is 0.1 parts by weight to 2.0 parts by weight with respect to 100 parts by weight of a total weight of the isocyanate (A) and the alcohol (B).

5. A method of manufacturing a molded product comprising:
a step of obtaining the polymerizable composition according to claim 1 by mixing an alcohol (B) and an acid phosphate (C) with each other to obtain a mixture and then further mixing the mixture with one or more isocyanates (A) having two or more isocyanato groups that contains an aromatic isocyanate at 30° C. or lower;
a step of casting the polymerizable composition into a casting mold; and
a step of starting polymerization of the polymerizable composition at 30° C. or lower to polymerize the composition.

6. A molded product obtained from the polymerizable composition for an optical material according to claim 1.

7. An optical material formed by the molded product according to claim 6.

8. A plastic lens formed by the optical material according to claim 7.

9. A method of manufacturing a plastic polarizing lens comprising:
- a step of obtaining the polymerizable composition according to claim 1 by mixing an alcohol (B) and an acid phosphate (C) with each other to obtain a mixture and then further mixing the mixture with one or more isocyanates (A) having two or more isocyanato groups that contains an aromatic isocyanate at 30° C. or lower;
- a step of fixing a polarizing film to an inside of a lens casting mold in a state where at least one surface of the polarizing film is separated from the mold;
- a step of pouring the polymerizable composition into a gap between the polarizing film and the mold; and
- a step of starting polymerization of the polymerizable composition at 30° C. or lower to polymerize and cure the composition and laminating a layer formed of a polyurethane resin on at least one surface of the polarizing film.

10. A plastic polarizing lens obtained by the method according to claim 9.

* * * * *